US008665582B2

(12) United States Patent
Robinson et al.

(10) Patent No.: US 8,665,582 B2
(45) Date of Patent: Mar. 4, 2014

(54) QUICK ROLL MOUNTING BRACKET FOR MODULAR PANELS

(75) Inventors: Kristopher Scott Robinson, Atlanta, GA (US); Jeffrey K. Hudgins, Jr., Gainesville, GA (US); Fan Zhang, Suwanee, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 537 days.

(21) Appl. No.: 12/710,448

(22) Filed: Feb. 23, 2010

(65) Prior Publication Data

US 2010/0212233 A1 Aug. 26, 2010

Related U.S. Application Data

(60) Provisional application No. 61/155,549, filed on Feb. 26, 2009.

(51) Int. Cl.
*H02B 1/015* (2006.01)

(52) U.S. Cl.
USPC ............................... 361/644; 49/63; 52/243.1

(58) Field of Classification Search
USPC ............ 52/247; 49/125, 61, 62, 63, 425, 426; 361/725, 727, 600, 601, 679.01
See application file for complete search history.

(56) References Cited

U.S. PATENT DOCUMENTS 2,719,251 A * 9/1955 Stewart ......................... 361/610
2,738,446 A * 3/1956 Fleming ........................ 361/650
2,793,860 A * 5/1957 De Crescenzo ............... 273/351
2,911,666 A * 11/1959 Schultz, Jr ........................ 16/40
2,913,997 A * 11/1959 Wolf ............................... 104/93
3,041,983 A * 7/1962 Liversidge et al. ............. 104/93
3,341,973 A * 9/1967 Miller ............................. 49/420
3,500,581 A * 3/1970 Lemelson ..................... 104/295
3,630,153 A * 12/1971 Guimarin ................... 104/138.1
3,670,357 A * 6/1972 Steigerwald .................... 16/105
4,020,301 A * 4/1977 Ericson et al. ............. 200/50.26
4,037,358 A * 7/1977 Rosenbaum .................... 446/30
4,078,335 A * 3/1978 Uehara ........................... 49/425
4,301,493 A * 11/1981 Schweikle et al. ............ 361/640
4,316,234 A * 2/1982 Takagi et al. ................. 361/614
4,358,815 A * 11/1982 Koslosky et al. ............. 361/640
4,462,192 A * 7/1984 Fisher ............................. 52/240
4,472,761 A * 9/1984 Koslosky et al. ............. 361/638
4,570,543 A * 2/1986 Ishikura et al. ............... 104/300
4,633,615 A * 1/1987 Moose ............................ 49/425
4,744,003 A * 5/1988 Koslosky et al. ............. 361/656
4,870,542 A * 9/1989 Koslosky et al. ............. 361/640
4,899,493 A * 2/1990 Baumgarten ................... 49/425
4,926,753 A * 5/1990 Weiss ......................... 104/88.03
5,069,512 A * 12/1991 Sykes ........................ 312/139.2
5,231,932 A * 8/1993 Enderlein et al. ............. 104/162

(Continued)

*Primary Examiner* — Joshua J Michener
*Assistant Examiner* — Matthew Gitlin

(57) ABSTRACT

The present invention relates generally to a mounting bracket for a modular panel. More particularly, the invention encompasses a quick roll mounting bracket for modular panels. The quick roll mounting bracket for a modular panel provides an easier/improved means for an installer to install a modular panel and to electrically and mechanically couple the modular panels together. The inventive roller bracket helps guide the modular panel during the coupling process by providing at least one wheel or a rolling interface to an otherwise metallic or metal-to-metal interface. The wheel or a rolling interface could be secured to the modular panel via at least one mounting bracket or via at least one spacer or at least one emboss.

17 Claims, 6 Drawing Sheets

(56) References Cited

U.S. PATENT DOCUMENTS

| | | | | | |
|---|---|---|---|---|---|
| 5,351,165 | A | * | 9/1994 | Hancock | 361/637 |
| 5,507,679 | A | * | 4/1996 | Getsay | 446/444 |
| 6,058,849 | A | * | 5/2000 | Ostholt et al. | 104/93 |
| 6,223,471 | B1 | * | 5/2001 | Barber | 49/425 |
| 6,520,830 | B1 | * | 2/2003 | Vollmar et al. | 446/444 |
| 7,647,729 | B2 | * | 1/2010 | Polus | 49/425 |
| 2008/0000158 | A1 | * | 1/2008 | Ranelli et al. | 49/209 |
| 2012/0013300 | A1 | * | 1/2012 | Prosser et al. | 320/109 |

* cited by examiner

QUICK ROLL MOUNTING BRACKET FOR MODULAR PANELS

CROSS-REFERENCE TO RELATED APPLICATION

The instant patent application claims priority to and the benefit of U.S. Provisional Patent Application Ser. No. 61/155,549, filed on Feb. 26, 2009, titled "Quick Roll Mounting Bracket for Modular Panels," the entire disclosure of which provisional application is incorporated herein by reference.

FIELD OF THE INVENTION

The present invention relates generally to a mounting bracket for a modular panel. More particularly, the invention encompasses a quick roll mounting bracket for modular panels. The quick roll mounting bracket for a modular panel provides an easier/improved means for an installer to install a modular panel and to electrically and mechanically couple the modular panels together. The inventive roller bracket helps guide the modular panel during the coupling process by providing at least one wheel or a rolling interface to an otherwise metallic or metal-to-metal interface. The wheel or a rolling interface could be secured to the modular panel via at least one mounting bracket or via at least one spacer or at least one emboss.

BACKGROUND INFORMATION

During the installation process of modular panelboards, multiple panels are mounted on a steel rail or an alignment rail, and are electrically and mechanically coupled together to distribute electrical power for residential, industrial, and commercial applications. During this coupling process, installers must slide these modular units along the alignment rail or hang them from an alignment rail. Most modular panels comprise of a steel or metallic bracket or a mounting bracket which interfaces with the alignment rail. It has become an industry standard for both the alignment rail and the mounting bracket to be steel, however, other metallic alignment rail and mounting bracket can also be used. With this type of an installation system many problems arise, such as, for example, misalignment of the alignment rails, mismatch of the steel rail with an alignment rail, difficulty in installing and removing the modular panel board, to name a few. Another problem that one sees is the friction associated with having a metal-to-metal interface when sliding and/or installing heavy equipment along the alignment rail.

Thus, there is a need for a better process for mounting and removing modular panel boards from an alignment rail. One such solution is to have a quick roll mounting bracket of this invention secured to either the back of a modular panelboard or the face of the mounting surface where the modular panel board is to be securely installed.

The use of rollers has been used in the sliding door industry for the easy sliding of doors and doors on tracks, such as, for example, U.S. Pat. No. 4,064,593 (B. J. Helmick), the entire disclosure of which is incorporated herein by reference, discloses a supporting roller assembly for a sliding door has a downwardly spring loaded guide track engaging roller supported for vertical floating movement by a mounting bracket containing a limited stop plunger which is spring loaded downwardly against the roller carrier. The bracket is slotted and carries a clamp screw accessible from the side of the door for clamping the bracket firmly about the plunger to secure the plunger in a fixed position for limiting upward movement of the guide roller against the action of its spring.

U.S. Pat. No. 6,286,261 (Gerald Alan Hackstock), the entire disclosure of which is incorporated herein by reference, discloses a sliding door for a vehicle having an opening in at least one side thereof, the sliding door is connected to the vehicle for non-linear movement along a fixed path between an open position and a closed position with respect to the opening. The fixed path is defined by an upper guide track, a lower guide track, and an intermediate guide track. Each elongate guide track has an identical generally C-shaped cross-section with an elongate slot opening through a lower surface. At least one guide member is engagable within each track for guiding the sliding door while moving in either direction between the open position and the closed position with respect to the opening in the vehicle. Preferably, at least one load bearing roller is provided on each door mounting bracket, or at least two load bearing rollers are provided on two of the three door mounting brackets.

U.S. Patent Publication No. 20080134583 (Doron Polus), the entire disclosure of which is incorporated herein by reference, discloses a non-hanging sliding door system includes a sliding door having an upper roller assembly disposed atop a portion of the door's frame, a channeled upper track configured to receive rollers of the upper roller assembly, a lower wheel assembly disposed at a bottom portion of the frame, and a guiding roller assembly. The lower wheel assembly includes a vertical spine having a transverse shaft, and a pair of sliding wheels that are rotatably coupled to the transverse shaft and are in direct contact with the ground without the need for a lower track. The guiding roller assembly includes one or more rollers that roll in frictional contact with the walls of a channel defined in the underside of the frame. The guiding roller assembly may be coupled either directly to the ground/floor below the door, or to a wall parallel to the door using a mounting bracket.

However, the panelboard industry has been using metal-to-metal interfaces for the installation of panelboards, and thus this invention improves on the deficiencies of the prior art and provides an inventive quick roll mounting bracket for modular panels.

PURPOSES AND SUMMARY OF THE INVENTION

The invention is a novel quick roll mounting bracket for modular panels.

Therefore, one purpose of this invention is to provide a quick roll mounting bracket for modular panels.

Another purpose of this invention is to provide a reliable solution for the mounting and dismounting of a panel board.

Yet another purpose of this invention is to provide a robust system for the quick installation and removal of panelboards from a mounting location.

Therefore, in one aspect this invention comprises a quick roll bracket assembly, comprising:

(a) a mounting bracket, said mounting bracket comprising a wheel support portion having a lower edge and a mounting portion; and (b) at least one wheel secured to said wheel support portion via at least one securing means, and wherein said at least one wheel has a first side edge, a second side edge, and a radial edge.

In another aspect this invention comprises a combination apparatus comprising a modular panel and a quick roll bracket assembly, comprising:

(a) a mounting bracket, said mounting bracket comprising a wheel support portion having a lower edge and a mounting portion;

(b) at least one wheel secured to said wheel support portion via at least one first securing means, and wherein said at least one wheel has a first side edge, a second side edge, and a radial edge;

(c) at least a portion of said radial edge of said wheel extends past said lower edge of said wheel support portion; and (d) a modular panel having a back face, and wherein said mounting portion of said mounting bracket is secured to said back face via at least one second securing means, such that said first side edge of said wheel faces said back face.

In yet another aspect this invention comprises a combination apparatus comprising a modular panel, a quick roll bracket assembly, and a mounting wall, comprising:

(a) a mounting bracket, said mounting bracket comprising a wheel support portion having a lower edge and a mounting portion;

(b) at least one wheel secured to said wheel support portion via at least one first securing means, and wherein said at least one wheel has a first side edge, a second side edge, and a radial edge;

(c) at least a portion of said radial edge of said wheel extends past said lower edge of said wheel support portion;

(d) a modular panel having a back face, and wherein said mounting portion of said mounting bracket is secured to said back face via at least one second securing means, such that said first side edge of said wheel faces said back face;

(e) a mounting wall having a mounting face; and (f) at least one alignment rail, wherein said alignment rail has a first mounting portion, an intermediate portion, and a second mounting portion, and wherein said first mounting portion is secured to a mounting surface via at least one third securing means, and wherein a portion of said radial edge of said wheel is in contact with said intermediate portion.

In still yet another aspect this invention comprises a combination apparatus comprising a modular panel and a quick roll bracket assembly, comprising:

(a) a mounting bracket, said mounting bracket comprising at least one spacer and at least one wheel, and wherein said spacer and said wheel are secured to a back surface of said modular panel via at least one securing means, such that said spacer is between said wheel and said back surface of said modular panel.

In yet another aspect this invention comprises a combination apparatus comprising a modular panel, a quick roll bracket assembly, and a mounting wall, comprising:

(a) a mounting bracket, said mounting bracket comprising at least one spacer and at least one wheel, and wherein said spacer and said wheel are secured to a back surface of said modular panel via at least one first securing means, such that said spacer is between said wheel and said back surface of said modular panel, and wherein said at least one wheel has a first side edge, a second side edge, and a radial edge;

(b) a mounting wall having a mounting face; and (c) at least one alignment rail, wherein said alignment rail has a first mounting portion, an intermediate portion, and a second mounting portion, and wherein said first mounting portion is secured to a mounting surface via at least one second securing means, and wherein a portion of said radial edge of said wheel is in contact with said intermediate portion.

In still yet another aspect this invention comprises a quick roll modular panel, comprising:

(a) a modular panel having a back surface, said back surface having a first plane and at least one emboss forming a second plane, and wherein said emboss is between said first plane and said second plane of said back surface; and (b) a wheel, said wheel having a radial edge and a side edge, and wherein said wheel is secured to said emboss via at least one securing means such that said side edge of said wheel is substantially parallel to the said first plane of said back surface.

In yet another aspect this invention comprises a quick roll bracket assembly, comprising:

(a) a mounting bracket, said mounting bracket comprising a wheel support portion having a lower edge and a mounting portion, and said mounting portion has at least one emboss; and (b) at least one wheel secured to said wheel support portion via at least one securing means, and wherein said at least one wheel has a first side edge, a second side edge, and a radial edge.

BRIEF DESCRIPTION OF THE DRAWINGS

Although the scope of the present invention is much broader than any particular embodiment, a detailed description of the preferred embodiment follows together with drawings. These drawings are for illustration purposes only and are not drawn to scale. Like numbers represent like features and components in the drawings. The invention may best be understood by reference to the ensuing detailed description in conjunction with the drawings in which.

DETAILED DESCRIPTION

As stated earlier that it has become an industry standard for both the alignment rail and the mounting bracket to be steel for the installation of panelboards. It has been discovered that a steel-to-steel interface provides a much higher coefficient of friction. Multiplying this coefficient of friction by the weight of a modular panel, would provide one with the force required to couple the panels together during an installation process. Since work is a product of force and distance, any means to lower the coefficient of friction will in turn lower the amount of work required to couple one or more modular panels during the installation and removal process. Thus, the inventive quick roll mounting bracket reduces the amount of work required to couple modular panels together due to the interface of the wheel or roller with the steel or metallic alignment rail.

In addition to reducing the work required to couple modular panels together with this invention, another problem this invention also addresses is the overcoming of the misalignment of overlapping alignment rails. For example, most alignment rails are between about 6 inches to about 18 inches in length, however, a wall of modular panels could be several feet long. To accommodate long runs of modular panels, alignment rails are aligned side-by-side until enough length of alignment rails are secured to the mounting wall or surface. It is not uncommon for the alignment rails to become misaligned during this process and creating uneven joints from rail to rail. A steel-to-steel interface when encountering these joints makes it almost impossible to overcome any misalignment in the alignment rails without physically picking-up or lifting the modular unit, clearing the rail misalignment, and then placing the modular unit back onto the alignment rail. However, with this inventive roller bracket the wheel will roll over or across any misalignments, and thus overcoming this problem.

Another problem that one sees in the installation of these modular panels is keeping the alignment rails aligned when mounting multiple adjoining rails on an uneven wall or mounting surface. This inventive quick roll mounting bracket overcomes this problem as the wheel of the roller bracket rolls over or across any misalignment, and allows the modular panel unit to be properly aligned and secured to the mounting surface or wall.

The quick roll mounting bracket for a modular panel also provides an easier/improved means for contractors, electricians, or anyone who might install modular panels, and to electrically and mechanically couple these modular panels together. The inventive roller bracket helps guide these modular panels during the coupling process by having a wheel or a roller in contact with an alignment rail, which is typically a metallic or a steel rail.

Figure 1:
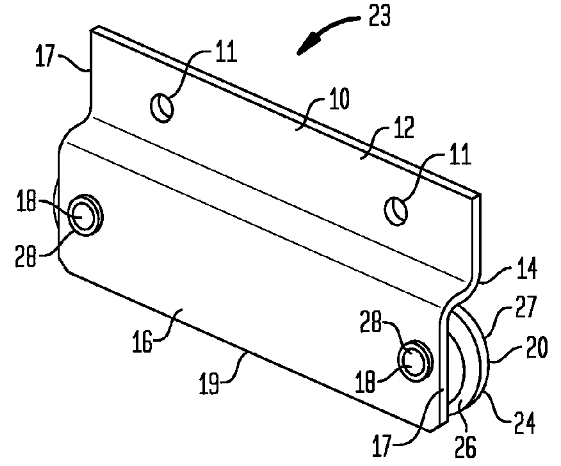
FIG. 1, illustrates a front isometric view of a first embodiment of an inventive quick roll bracket assembly.

FIG. 1, illustrates a front isometric view of a first embodiment of an inventive quick roll bracket assembly 23. The quick roll bracket assembly 23, comprises of a mounting bracket 10, having a first or mounting portion 12, an intermediate or wheel guide or channel portion 14, and a second or a wheel support portion 16. The mounting bracket 10, may have at least one hole or opening or location 11, for securing a securing means 22, shown in FIG. 5. The second portion 16, has at least one hole or opening or location 18, for securing a wheel axle 28, of a wheel or a roller 20, having a radial edge or portion 27. The wheel or roller 20, also has a first face or edge 24, and a second face or edge 26, such that when the wheel or roller 20, is secured to the wheel support portion 16, the second face or edge 26, is substantially parallel to the face of the wheel support portion 16. The quick roll bracket assembly 23, has a side edge 17, and a bottom edge 19.

Figure 2:
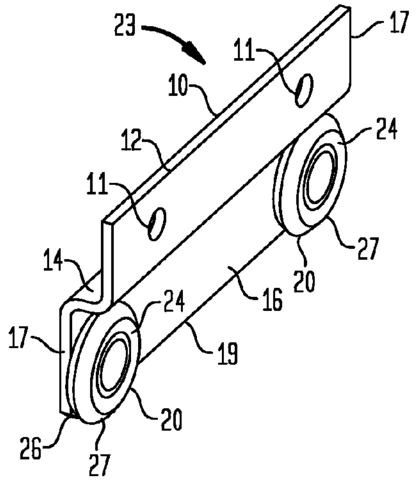
FIG. 2, illustrates a rear isometric view of the first embodiment of the inventive quick roll bracket assembly of FIG. 1.

FIG. 2, illustrates a rear isometric view of the first embodiment of the inventive quick roll bracket assembly 23, of FIG. 1. As one can see that the quick roll bracket assembly 23, has sufficient space for the free rolling movement of the at least one wheel or roller 20. For the purposes of illustration the quick roll bracket assembly 23, is shown with two wheels 20, however, the quick roll bracket assembly 23, could have a single wheel 20, or more than two wheels 20. The wheels 20, can be of the same radial and/or axial size or of a different size. Having the option of having wheels 20, of two different axial and/or radial sizes allows any adjustment during the installation process, such as, due to any mismatch and/or alignment problems that may arise during the installation of the modular panel 50.

Figure 3:
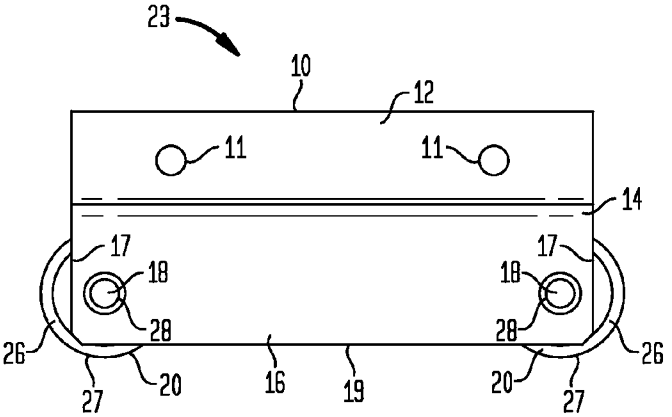
FIG. 3, illustrates a front view of the first embodiment of the inventive quick roll bracket assembly of FIG. 1.

FIG. 3, illustrates a front view of the first embodiment of the inventive quick roll bracket assembly 23, of FIG. 1. The roller or wheel 20, could be positioned within the wheel support bracket 16, or the radial edge 27, could extend outwardly at the side edge 17, of the wheel support bracket 16, as well as the bottom edge 19, of the wheel support bracket 16.

Figure 4:
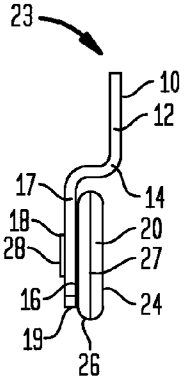
FIG. 4, illustrates a side view of a second embodiment of the inventive quick roll bracket assembly.

FIG. 4, illustrates a side view of a second embodiment of the inventive quick roll bracket assembly 23. The second embodiment of the inventive quick roll bracket assembly 23, has at least one roller or wheel 20. As illustrated in FIG. 4, the roller or wheel 20, is positioned in the wheel support bracket 16, in such a way, so that at least a radial edge or portion 27, of the roller or wheel 20, extends outwardly and below the bottom edge 19, of the wheel support portion 16, while the rest of the radial edge or portion 27, of the wheel 20, does not extend beyond the side edge 17. For some applications it is preferred that the edge 24, 26, of the wheel 20, is within the plane created by the portions 12, 16, of the mounting bracket 10.

Figure 5:
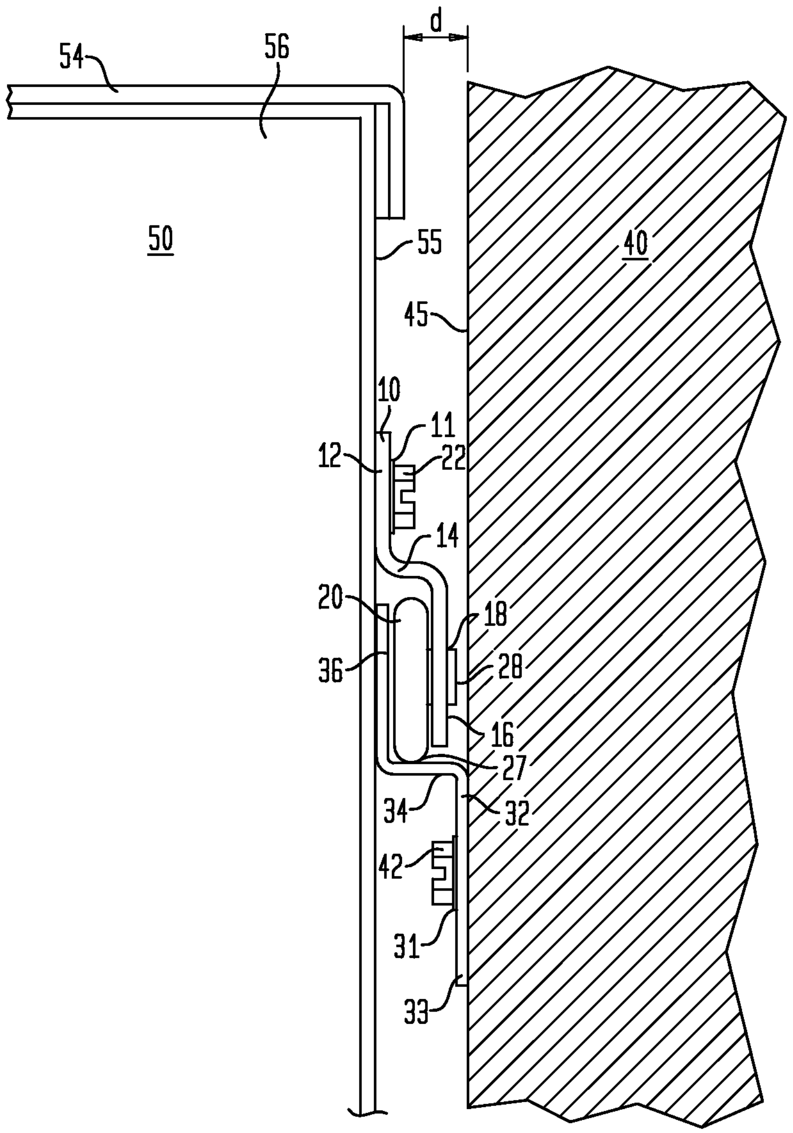
FIG. 5, illustrates a side cross-sectional view of an exemplary embodiment of a modular panel, with a quick roll bracket assembly of this invention installed and an alignment rail secured to a mounting surface.

FIG. 5, illustrates a side cross-sectional view of an exemplary embodiment of a modular panel or unit 50, with a quick roll bracket assembly 23, installed and an alignment rail 33, secured to a mounting surface or a wall 40. The modular panel or unit 50, has a back face or surface 55, a side face or surface 56, and optionally, a cover or protective panel or surface 54. The alignment rail 33, has a first or a wall mounting portion 32, and a second or a wheel alignment/guide portion 36. The first portion 32, is secured to the second portion 36, via an intermediate or a wheel guide or channel portion 34. The first portion 32, has at least one opening or hole or location 31, for securing the alignment rail 33, via at least one securing means 42, to the mounting face 45, of the mounting surface or wall 40. It is preferred that the intermediate portion 34, is substantially flat to accommodate the rolling movement of the wheel 20, however, the intermediate portion 34, could have a u-shaped channel or similar indentation (not shown) to allow the rolling movement of the wheel or roller 20. The quick roll bracket assembly 23, is secured to the back surface or face 55, of the modular panel 50, via at least one securing means 22. For some applications the quick roll bracket assembly 23, could be welded to the back surface or face 55, of the modular panel 50. The securing means 22, could utilize the hole or opening or location 11, to secure the quick roll bracket assembly 23, to the back surface 55, of the modular panel 50. The modular panel 50, could be an open modular panel 50, or it could have at least one protective panel or cover 54. It is preferred that there be a distance "d" between the back of the modular panel 50, and the face of the mounting surface 40, so as to allow for the easy mounting and dismounting of the modular panel 50, from the alignment rail 33, which is secured to the mounting surface 40. As one can see that when a force is applied to the side of the modular panel 50, the wheel 20, will easily roll along the surface of the intermediate portion 34, of the alignment rail 33, and easily move or slide the modular panel 50, to the desired location along the mounting surface or a wall 40. Similarly, any misalignment between a first alignment rail 33, and a next alignment rail 33, will be easily accommodated by the wheel 20. Additionally, if the modular panel 50, is not level then one can easily adjust this by having wheels 20, of varying sizes to accommodate any leveling mismatch of modular panel 50, and/or the alignment rail 33.

Figure 6A:
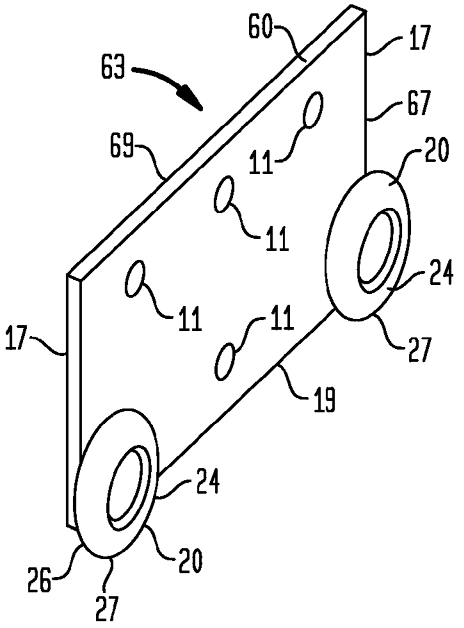
FIG. 6A, illustrates a rear isometric view of a third embodiment of an inventive quick roll bracket assembly.

FIG. 6A, illustrates a rear isometric view of a third embodiment of an inventive quick roll bracket assembly 63. The quick roll bracket assembly 63, comprises of a mounting bracket 60, having a first face or surface 67, and a second face or surface 69. The mounting bracket 60, may have at least one hole or opening or location 11, for securing a securing means 22, shown in FIG. 5. The mounting bracket 60, has at least one hole or opening or location 18, for securing the wheel axle 28, of the wheel or the roller 20, having a radial edge or portion 27. It is preferred that the wheel 20, is secured to the mounting bracket 60, in such a way that the wheel axle 28, is substantially perpendicular to the surface 67, while the radial portion 27, of the wheel is substantially parallel to the surface 67. Thus, in other words the second face or side edge 26, of the wheel or roller 20, is substantially parallel to the face of the first surface 67, of the mounting bracket 60. The quick roll bracket assembly 63, has a side edge 17, and a bottom edge 19. For the purposes of illustration the quick roll bracket assembly 63, is shown with two wheels 20, however, the quick roll bracket assembly 63, could have a single wheel 20, or more than two wheels 20.

Figure 6B:
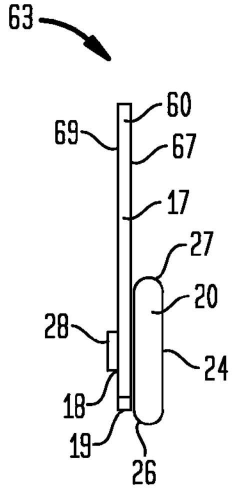
FIG. 6B, illustrates a side view of the third embodiment of the inventive quick roll bracket assembly of FIG. 6A.

FIG. 6B, illustrates a side view of the third embodiment of the inventive quick roll bracket assembly 63, shown in FIG. 6A. As can be seen in FIG. 6A and FIG. 6B, that the mounting bracket 60, is similar to the mounting bracket 10, however, the portions 12, 14, 16, have been integrated resulting in a substantially flat mounting bracket 60. During installation the surface 69, faces the back face or surface 55, of the modular panel 50, and the mounting bracket 60, is secured to the back surface 55, via at least one securing means 22. For some applications the quick roll bracket assembly 63, could be welded to the back surface or face 55, of the modular panel 50. After the mounting bracket 60, has been secured to the modular panel 50, the modular panel is then installed along the mounting surface 40, such that at least one wheel 20, is in contact with the surface of the alignment rail 33.

Figure 7A:
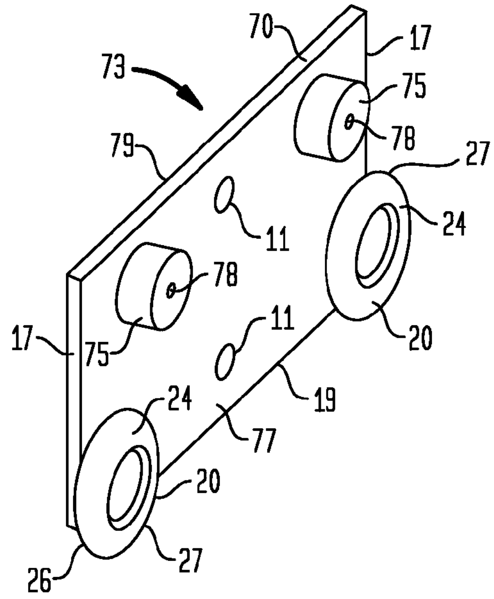
FIG. 7A, illustrates a rear isometric view of a fourth embodiment of an inventive quick roll bracket assembly.

FIG. 7A, illustrates a rear isometric view of a fourth embodiment of an inventive quick roll bracket assembly 73. The quick roll bracket assembly 73, comprises of a mounting bracket 70, having a first face or surface 77, and a second face or surface 79. At least one spacer or standoff 75, is secured to the mounting bracket 70, along a portion of the second surface 79. The mounting bracket 70, may have at least one hole or opening or location 11, for securing a securing means 22, shown in FIG. 5. The mounting bracket 70, has at least one hole or opening or location 18, for securing the wheel axle 28, of the wheel or the roller 20, having a radial edge or portion 27. It is preferred that the wheel 20, is secured to the mounting bracket 70, in such a way that the wheel axle 28, is substantially perpendicular to the surface 77, while the radial portion 27, of the wheel is substantially parallel to the surface 77. Thus, in other words the second face or side edge 26, of the wheel or roller 20, is substantially parallel to the face of the first surface 77, of the mounting bracket 70. The quick roll bracket assembly 73, has a side edge 17, and a bottom edge 19. For the purposes of illustration the quick roll bracket assembly 73, is shown with two wheels 20, however, the quick roll bracket assembly 73, could have a single wheel 20, or more than two wheels 20. As one can clearly see in FIG. 7A, that the stand-off 75, is secured to the mounting bracket 70, via at least one securing means 78.

Figure 7B:
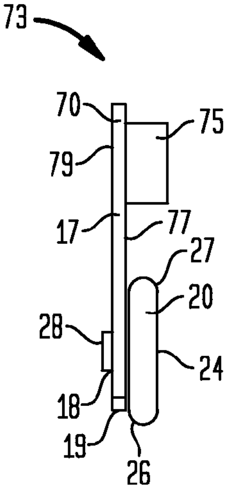
FIG. 7B, illustrates a side view of the fourth embodiment of the inventive quick roll bracket assembly of FIG. 7A.

FIG. 7B, illustrates a side view of the fourth embodiment of the inventive quick roll bracket assembly 73, shown in FIG. 7A. As can be seen in FIG. 7A and FIG. 7B, that the mounting bracket 70, is similar to the mounting bracket 10, however, the portions 12, 14, 16, have been integrated resulting in a substantially flat mounting bracket 70. During installation the surface 79, faces the back face or surface 55, of the modular panel 50, and the mounting bracket 70, is secured to the back surface 55, via at least one securing means 22. For some applications the quick roll bracket assembly 73, could be welded to the back surface or face 55, of the modular panel 50. After the mounting bracket 70, has been secured to the modular panel 50, the modular panel is then installed along the mounting surface 40, such that at least one wheel 20, is in contact with the surface of the alignment rail 33.

Figure 8A:
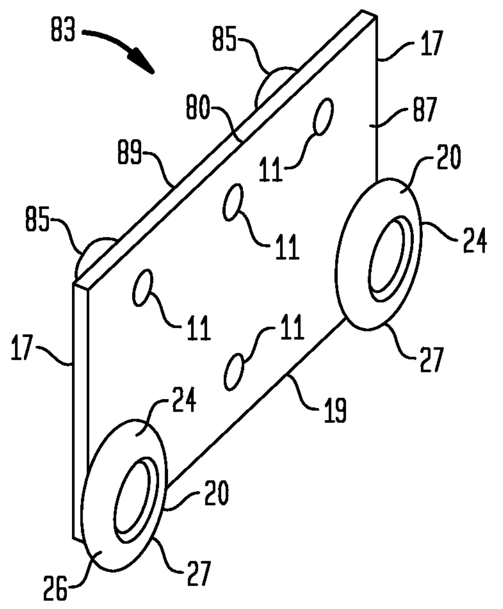
FIG. 8A, illustrates a rear isometric view of a fifth embodiment of an inventive quick roll bracket assembly.

FIG. 8A, illustrates a rear isometric view of a fifth embodiment of an inventive quick roll bracket assembly 83. The quick roll bracket assembly 83, comprises of a mounting bracket 80, having a first face or surface 87, and a second face or surface 89. At least one spacer or standoff 85, is secured to the mounting bracket 80, along a portion of the second surface 89. The mounting bracket 80, may have at least one hole or opening or location 11, for securing a securing means 22, shown in FIG. 5. The mounting bracket 80, has at least one hole or opening or location 18, for securing the wheel axle 28, of the wheel or the roller 20, having a radial edge or portion 27. It is preferred that the wheel 20, is secured to the mounting bracket 80, in such a way that the wheel axle 28, is substantially perpendicular to the surface 87, while the radial portion 27, of the wheel is substantially parallel to the surface 87. Thus, in other words the second face or side edge 26, of the wheel or roller 20, is substantially parallel to the face of the first surface 87, of the mounting bracket 80. The quick roll bracket assembly 83, has a side edge 17, and a bottom edge 19. For the purposes of illustration the quick roll bracket assembly 83, is shown with two wheels 20, however, the quick roll bracket assembly 83, could have a single wheel 20, or more than two wheels 20.

Figure 8B:
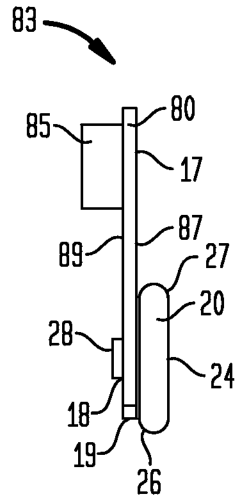
FIG. 8B, illustrates a side view of the fifth embodiment of the inventive quick roll bracket assembly of FIG. 8A.

FIG. 8B, illustrates a side view of the fifth embodiment of the inventive quick roll bracket assembly 83, shown in FIG. 8A. As can be seen in FIG. 8A and FIG. 8B, that the mounting bracket 80, is similar to the mounting bracket 10, however, the portions 12, 14, 16, have been integrated resulting in a substantially flat mounting bracket 80. During installation the surface 89, faces the back face or surface 55, of the modular panel 50, and the mounting bracket 80, is secured to the back surface 55, via at least one securing means 22. For some applications the quick roll bracket assembly 83, could be welded to the back surface or face 55, of the modular panel 50. After the mounting bracket 80, has been secured to the modular panel 50, the modular panel is then installed along the mounting surface 40, such that at least one wheel 20, is in contact with the surface of the alignment rail 33.

Figure 8C:
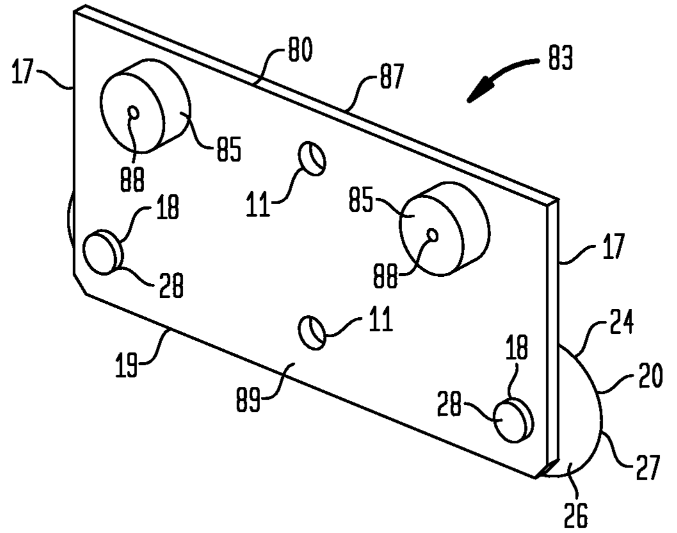
FIG. 8C, illustrates a front isometric view of the fifth embodiment of the inventive quick roll bracket assembly of FIG. 8A.

FIG. 8C, illustrates a front isometric view of the fifth embodiment of the inventive quick roll bracket assembly 83, shown in FIG. 8A. As one can clearly see that the stand-off 85, is secured to the mounting bracket 80, via at least one securing means 88.

In FIGS. 7A, 7B, 8A, 8B, and 8C the spacer or standoff 75, 85, is shown on one surface of the mounting bracket 70, 80, respectively, however, it is contemplated that for some applications one may have the spacer or standoff 75, 85, on both sides of the mounting bracket 70, 80.

Figure 9A:
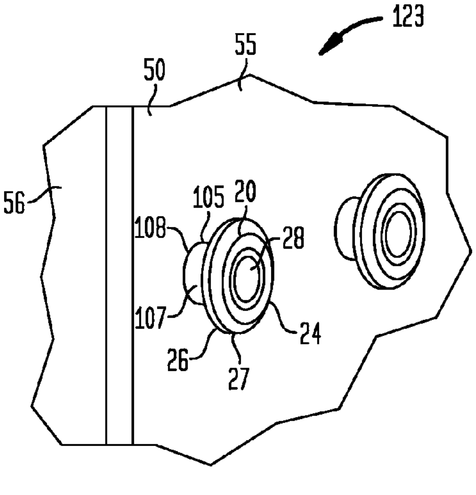
FIG. 9A, illustrates a rear isometric view of a sixth embodiment of an inventive quick roll bracket assembly secured to a modular panel.

FIG. 9A, illustrates a rear isometric view of a sixth embodiment of an inventive quick roll bracket assembly 123, secured to a modular panel or unit 50. It is preferred that at least one stand-off or spacer 105, be between the back face or surface 55, and edge surface 26, of the wheel 20. The wheel 20, and the spacer 105, are preferably secured to the back face or surface 55, via at least one securing means 108. For some applications it is preferred that the spacer 105, has a surface 107, which is substantially perpendicular to the back face or surface 55. It is however preferred that the wheel 20, rotates about the axle 28. For some applications the wheel 20, and the spacer 105, could be one unit and thus the spacer 105, and the wheel 20, would rotate around the wheel axle 28. For the purposes of illustration the quick roll bracket assembly 123, is shown with two wheels 20, however, the quick roll bracket assembly 123, could have a single wheel 20, or more than two wheels 20.

Figure 9B:
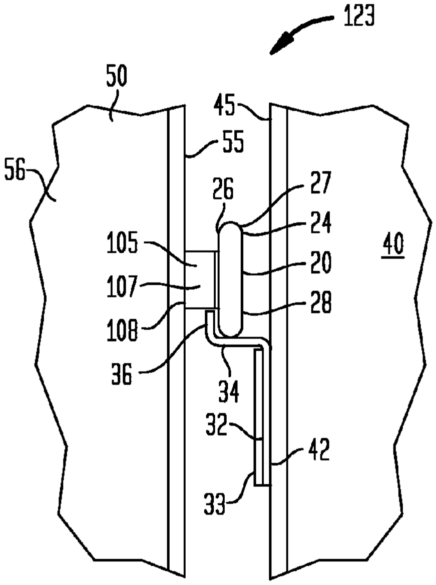
FIG. 9B, illustrates a side view of the sixth embodiment of the inventive quick roll bracket assembly of FIG. 9A.

FIG. 9B, illustrates a side view of the sixth embodiment of the inventive quick roll bracket assembly 123, shown in FIG. 9A. As can be seen in FIG. 9B, that the radial edge 27, of the wheel 20, rests on top of the intermediate portion 34, of the alignment rail 33, such that the side edge 24, faces the mounting face 45, while the side edge 26, faces the back face 55, of the modular panel or unit 50.

Figure 10A:
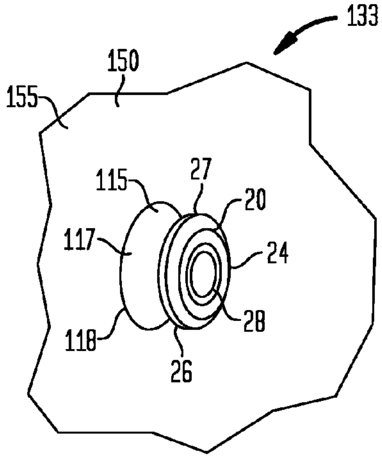
FIG. 10A, illustrates a rear isometric view of a seventh embodiment of an inventive quick roll bracket assembly secured to a modular panel.

FIG. 10A, illustrates a rear isometric view of a seventh embodiment of an inventive quick roll modular panel 133, where the wheel or roller 20, is directly secured to a modular panel or unit 150. The modular panel or unit 150, has a back face or surface 155, a side face or surface 56, shown in FIG. 10B, an emboss or relief or raised protrusion 115, and optionally a protective panel or cover 54. The emboss 115, can be made into the modular panel 150, by methods well known in the art, such as, for example, applying pressure to the inner surface of the back surface 155, so that a protrusion or emboss or raised relief 115, that extends out of the plane of the back surface 155, is formed. It should be appreciated that the emboss 115, is part of the back surface 155, however, it is a portion of the back surface 155, that extends a distance out of the back surface 155, such that a substantial portion of back surface 155, forms a first plane, while, the extreme surface or edge, created as the result of the emboss 115, forms a second plane for the back surface 155. As shown, the modular panel 150, once embossed, provides a distance between the back face or surface 155, and edge surface 26, of the wheel 20. The wheel 20, is preferably secured to the back face of emboss 115, via at least one securing means 118. Emboss 115, is integrally formed from the back surface 155, and is part of the extension of the back surface 155. The emboss 115, has a surface 117, which preferably has a slope originating from the back face or surface 155. The emboss 115, is a non-moving part and thus the wheel 20, rotates about the axle 28. For the purposes of illustration the quick roll modular panel 133, is shown with a single wheel 20, however, the quick roll modular panel 133, could have a single wheel 20, or more than two wheels 20, secured to the back surface 155, via emboss 115.

Figure 10B:
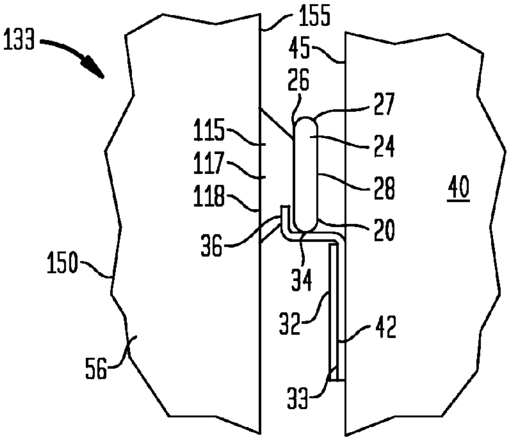
FIG. 10B, illustrates a side view of the seventh embodiment of the inventive quick roll bracket assembly of FIG. 10A.

FIG. 10B, illustrates a side view of the seventh embodiment of the inventive quick roll modular panel 133, shown in FIG. 10A. As can be seen in FIG. 10B, that the radial edge 27, of the wheel 20, rests on top of the intermediate portion 34, of the alignment rail 33, such that the side edge 24, faces the mounting face 45, while the side edge 26, faces the back face 155, of the modular panel or unit 150. In some applications the edge portion of the wheel support portion 26, may be wedged between the side edge 26, and the surface 117, as long as the rotation movement of the wheel 20, is not impaired.

Figure 11A:
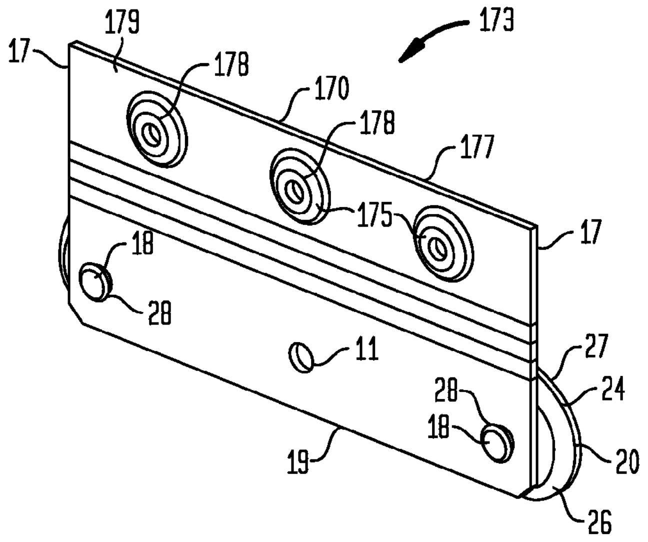
FIG. 11A and FIG. 11C, illustrate an isometric view of an eighth embodiment of an inventive quick roll bracket assembly.
Figure 11B:
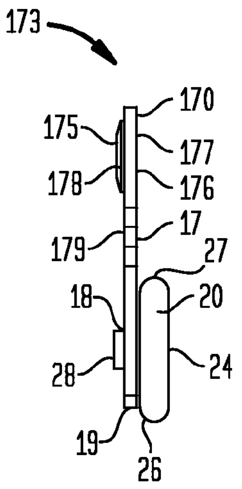
FIG. 11B, illustrates a side view of the eighth embodiment of the inventive quick roll bracket assembly of FIG. 11A, and FIG. 11C.
Figure 11C:
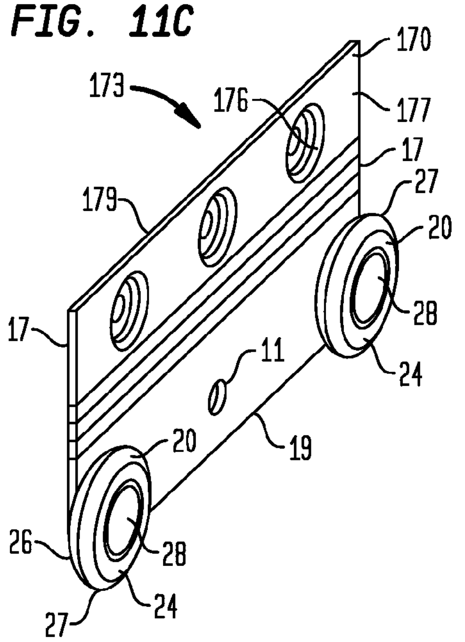

FIG. 11A and FIG. 11 C, illustrate an isometric view of an eighth embodiment of an inventive quick roll bracket assembly 173. The quick roll bracket assembly 173, comprises of a mounting bracket 170, having a first face or surface 177, and a second face or surface 179. Either the first surface 177, or the second surface 179, is pressed or punched so as to create an emboss or relief 175. The emboss 175, basically acts as a spacer or standoff 175, for the mounting bracket 170. The emboss creates a male portion 178, and a female portion 176. As one can see in FIG. 11A and FIG. 11C, the male portion 178, is on the side of the surface 179, and projects or protrudes outwardly, while the female portion 176, is on the side of the surface 177, and creates a cavity 176. The mounting bracket 170, may have at least one hole or opening or location 11, for securing a securing means 22, shown in FIG. 5. The mounting bracket 170, has at least one hole or opening or location 18, for securing the wheel axle 28, of the wheel or the roller 20, having a radial edge or portion 27. It is preferred that the wheel 20, is secured to the mounting bracket 170, in such a way that the wheel axle 28, is substantially perpendicular to the surface 177, while the radial portion 27, of the wheel is substantially parallel to the surface 177. Thus, in other words the second face or side edge 26, of the wheel or roller 20, is substantially parallel to the face of the first surface 177, of the mounting bracket 170. The quick roll bracket assembly 173, has a side edge 17, and a bottom edge 19. For the purposes of illustration the quick roll bracket assembly 173, is shown with two wheels 20, however, the quick roll bracket assembly 173, could have a single wheel 20, or more than two wheels 20.

FIG. 11B, illustrates a side view of the eighth embodiment of the inventive quick roll bracket assembly 173, shown in FIG. 11A and FIG. 11C. As can be seen in FIG. 11A, FIG. 11B, and FIG. 11C, that the mounting bracket 170, is similar to the mounting bracket 10, however, the portions 12, 14, 16, have been integrated resulting in a substantially flat mounting bracket 170. During installation the surface 179, faces the back face or surface 55, of the modular panel 50, and the mounting bracket 170, is secured to the back surface 55, via at least one securing means 22. For some applications the quick roll bracket assembly 173, could be welded to the back surface or face 55, of the modular panel 50. After the mounting bracket 170, has been secured to the modular panel 50, the modular panel is then installed along the mounting surface 40, such that at least one wheel 20, is in contact with the surface of the alignment rail 33.

In a preferred embodiment the quick roll bracket or wheel assembly 23, 63, 73, 83, 123, 133, 173, preferably comprises of at least two wheels or rollers 20, however, for some applications the quick roll bracket assembly 23, 63, 73, 83, 123, 133, 173, could have one or more wheel or roller 20.

The mounting bracket 10, 60, 70, 80, 170, is preferably made from material selected from a group comprising steel, aluminum, metallic material, composite material, plastic, to name a few.

The alignment rail 33, is preferably made from material selected from a group comprising steel, aluminum, metallic material, composite material, plastic, to name a few.

The roller or wheel 20, is preferably made from material selected from a group comprising steel, aluminum, metallic material, composite material, plastic, rubber material, to name a few.

The securing means 22, 42, 78, 88, 108, 118, is preferably selected from a group comprising a screw, a bolt, a rivet, a nail, a weld, to name a few.

The spacer 75, 85, 105, is preferably made from material selected from a group comprising steel, aluminum, metallic material, composite material, plastic, rubber material, ceramic, to name a few. It is within the realm of a person skilled in the art to form a spacer 75, 85, using the mounting bracket 70, 80, respectively, as a base material, such as, for example, by embossing, which would be similar to the process of forming emboss 115, from the back surface 155, of the modular panel 150, or the emboss 175, in the mounting bracket 170.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A combination apparatus, comprising:

a first electrical modular panelboard and a second electrical modular panelboard;

a quick roll bracket assembly configured to electrically and mechanically couple together the first electrical modular panelboard and the second electrical modular panelboard, wherein said quick roll bracket assembly includes a mounting bracket, said mounting bracket comprising a wheel support portion having a lower edge and a mounting portion;

at least one wheel secured to said wheel support portion via at least one first securing means, and wherein said at least one wheel has a first side edge, a second side edge, and a radial edge;

at least a portion of said radial edge of said wheel extends past said lower edge of said wheel support portion; and wherein said first electrical modular panelboard having a back face and including one or more automatic overcurrent devices, and wherein said mounting portion of said mounting bracket is secured to said back face via at least one second securing means, such that said first side edge of said wheel faces said back face.

2. The combination apparatus of claim 1, wherein material for said mounting bracket is selected from a group consisting of steel, aluminum, metallic material, composite material, and plastic.

3. The combination apparatus of claim 1, wherein material for said wheel is selected from a group consisting of steel, aluminum, metallic material, composite material, plastic, and rubber material.

4. The combination apparatus of claim 1, wherein said at least one first securing means is selected from a group consisting of a screw, a bolt, a rivet, a nail, and a weld.

5. The combination apparatus of claim 1, wherein said wheel support portion has a side edge and wherein a portion of said radial edge extends out of said side edge.

6. The combination apparatus of claim 1, wherein said wheel support portion has a side edge and wherein said radial edge does not extend outside of said side edge.

7. The combination apparatus of claim 1, wherein said at least one second securing means is selected from a group consisting of a screw, a bolt, a rivet, a nail, and a weld.

8. A combination apparatus, comprising:

a first electrical modular panelboard and a second electrical modular panelboard;

a quick roll bracket assembly configured to electrically and mechanically couple together the first electrical modular panelboard and the second electrical modular panelboard, wherein said quick roll bracket assembly includes a mounting bracket, said mounting bracket comprising a wheel support portion having a lower edge and a mounting portion;

at least one wheel secured to said wheel support portion via at least one first securing means, and wherein said at least one wheel has a first side edge, a second side edge, and a radial edge;

at least a portion of said radial edge of said wheel extends past said lower edge of said wheel support portion;

wherein said first electrical modular panelboard having a back face and including one or more automatic overcurrent devices, and wherein said mounting portion of said mounting bracket is secured to said back face via at least one second securing means, such that said first side edge of said wheel faces said back face; and a mounting wall having a mounting face; and at least one alignment rail, wherein said alignment rail has a first mounting portion, an intermediate portion, and a second mounting portion, and wherein said first mounting portion is secured to a mounting surface via at least one third securing means, and wherein a portion of said radial edge of said wheel is in contact with said intermediate portion.

9. The combination apparatus claim 8, wherein material for said mounting bracket is selected from a group consisting of steel, aluminum, metallic material, composite material, and plastic.

10. The combination apparatus claim 8, wherein material for said wheel is selected from a group consisting of steel, aluminum, metallic material, composite material, plastic, and rubber material.

11. The combination apparatus claim 8, wherein said at least one first securing means is selected from a group consisting of a screw, a bolt, a rivet, a nail, and a weld.

12. The combination apparatus claim 8, wherein said first wheel support portion has a side edge and wherein a portion of said radial edge extends out of said side edge.

13. The combination apparatus claim 8, wherein said first wheel support bracket has a side edge and wherein said radial edge does not extend outside of said side edge.

14. The combination apparatus claim 8, wherein said at least one second securing means is selected from a group consisting of a screw, a bolt, a rivet, a nail, and a weld.

15. The combination apparatus claim 8, wherein material for said at least one alignment rail is selected from a group consisting of steel, aluminum, metallic material, composite material, and plastic.

16. The combination apparatus claim 8, wherein material for said wheel is selected from a group consisting of steel, aluminum, metallic material, composite material, plastic, and rubber material.

17. The combination apparatus claim 8, wherein said at least one third securing means is selected from a group consisting of a screw, a bolt, a rivet, a nail, and a weld.

* * * * *